United States Patent
Jiang

(10) Patent No.: US 9,727,236 B2
(45) Date of Patent: Aug. 8, 2017

(54) COMPUTER INPUT DEVICE

(71) Applicant: Peigen Jiang, Sammamish, WA (US)

(72) Inventor: Peigen Jiang, Sammamish, WA (US)

( * ) Notice: Subject to any disclaimer, the term of this patent is extended or adjusted under 35 U.S.C. 154(b) by 316 days.

(21) Appl. No.: 14/471,828

(22) Filed: Aug. 28, 2014

(65) Prior Publication Data
US 2016/0062643 A1    Mar. 3, 2016

(51) Int. Cl.
*G06F 3/0488* (2013.01)
*G06F 3/02* (2006.01)

(52) U.S. Cl.
CPC ........ *G06F 3/04886* (2013.01); *G06F 3/0213* (2013.01); *G06F 3/0488* (2013.01)

(58) Field of Classification Search
CPC ............................ G06F 3/0488; G06F 3/04817
USPC .......................................... 345/173; 715/835
See application file for complete search history.

(56) References Cited

U.S. PATENT DOCUMENTS

| | | | |
|---|---|---|---|
| 8,872,796 B2 * | 10/2014 | Yoo ........................ | G06F 3/0488 345/173 |
| 2011/0252373 A1 * | 10/2011 | Chaudhri ............ | G06F 3/04817 715/835 |
| 2015/0020030 A1 * | 1/2015 | Yoo ........................ | G06F 3/0488 715/835 |

* cited by examiner

*Primary Examiner* — Albert Wong

(57) ABSTRACT

A computer input method includes obtaining a time interval elapsed between a current single touch and a last single touch both on a designated object upon detecting the current single touch, comparing the time interval with a predetermined reference time, and switching a pointing input of the computer input method between an absolute coordinate mode and relative coordinate mode depending on the time comparison result.

14 Claims, 3 Drawing Sheets

COMPUTER INPUT DEVICE

BACKGROUND

The present invention relates generally to human input devices for computing systems, and, more particularly, to a computer pointing device.

One of the most popular ways to position a cursor on a computer display is to use a mouse, which functions by detecting two dimensional motions relative to its supporting surface. Physically, a mouse comprises an object held under one of a user's hands, with one or more buttons. Clicking or hovering (stopping movement while the cursor is within the bounds of an area) can select files, programs or actions from a list of names, or (in graphical interfaces) through small images called "icons" and other elements. For example, a text file might be represented by a picture of a paper notebook, and clicking while the cursor hovers over this icon may cause a text editing program to open the file in a window.

However, conventional mice employ a relative coordinate system to position cursors. In a relative coordinate system, a cursor's coordinates are derived from the cursor's last coordinates and the mouse's travel distance, angle and speed. If an icon is on one side of a display while the cursor's last location is on the other side of the display, a computer user would have to drag the mouse over a sizable distance or with high speed to move the cursor over to the icon. In contrast, in an absolute coordinate system, a cursor's coordinates are derived directly from the mouse's current coordinates regardless of its last location. By employing absolute coordinate system, a computer user can directly place a cursor at a desired location without mouse dragging movement.

As such, what is desired is a computer pointing device that can automatically switch between relative coordinate mode and absolute coordinate mode.

BRIEF DESCRIPTION OF THE DRAWING

FIG. 2 illustrates correspondence between corners of the touch sensing area of the computer input device of FIG. 1 and corners of a computer display the computer input device is associated with.

Figure 1:
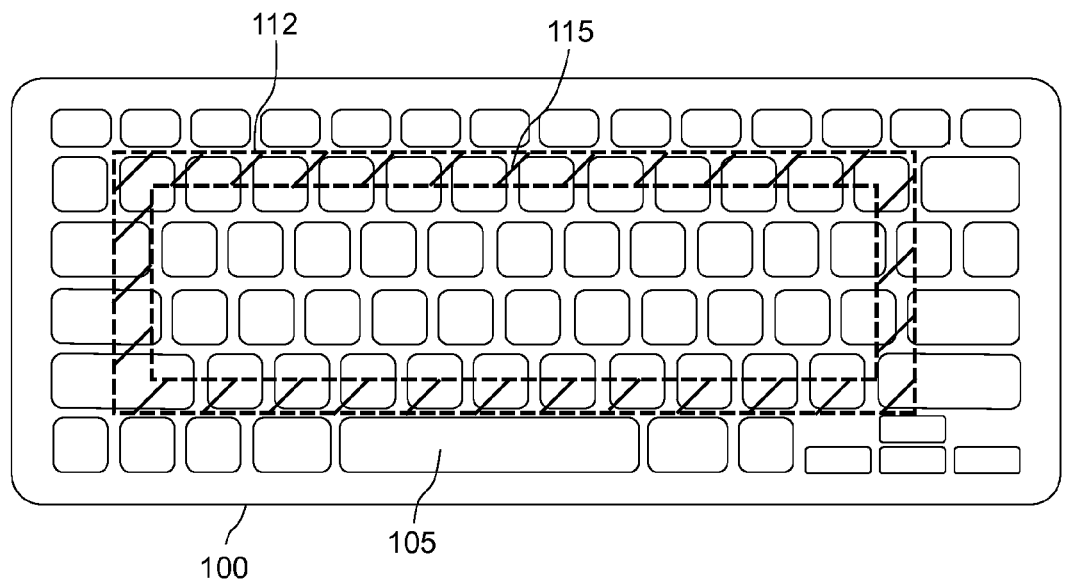
FIG. 1 illustrates a computer input device with a designated touch sensing area for providing pointing input according an embodiment of the present invention.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to a computer input device utilizing a touch sensing device for pointing that can be automatically switched between absolute coordinate mode and relative coordinate mode operations. Preferred embodiments of the present invention will be described hereinafter with reference to the attached drawings.

FIG. 1 illustrates a computer input device 100 with a designated touch sensing area 112 for providing pointing input according an embodiment of the present invention. The computer input device 100 is a mouse-and-keyboard combo device as described in a patent application Ser. No. 13/341,913 by the same inventor, and the content of which is incorporated herein in its entirety.

As shown in FIG. 1, the computer input device 100 has a plurality of keys 105, which overlays the designated touch sensing area 112. Only touches within the designated touch sensing area 112 can be detected. There are numerous ways to detect the touches, such as infrared light emitting diodes (LED), capacitive or resistive touch pad. In embodiments, a peripheral area marked by the shaded area 115 is designated to be an area for entering absolute coordinates. The reason that only the peripheral area 115 is designated for entering absolute coordinates is because on a computer display, menu items are generally displayed on edges of the display. When a computer user wants to place a cursor over a menu item displayed on an edge, he or she can touch a corresponding spot in the peripheral area 115, which will result in the cursor being placed directly in a vicinity of the menu item through an absolute coordinate mode operation. Then the user can slightly move the cursor exactly over the menu item through a relative coordinate mode operation. With a conventional mouse, the computer user would have to drag the mouse over a distance to move the cursor over the menu item. In other embodiments, the absolute coordinate entering area is not restricted to the peripheral area 115, and can be any other or even the entire area of the touch sensing area 112.

However, not every touch on the absolute coordinate entering area will generate absolute coordinates. Other conditions which will be described hereinafter, have to be met before the computer input device 100 switches from a default relative coordinate mode to the absolute coordinate mode operation.

Figure 2:
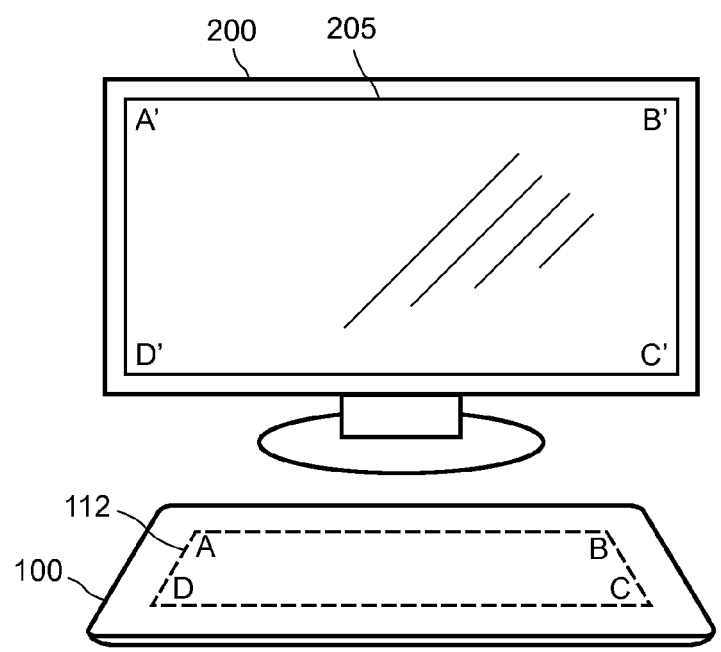

FIG. 2 illustrates correspondence between corners of the touch sensing area 112 of the computer input device 100 of FIG. 1 and corners of a computer display 200 the computer input device 100 is associated with. The touch sensing area 112 has four corners respectively labeled as A, B, C and D. The computer display 200 has a display area 205 which has four corners respectively labeled as A', B', C' and D'. During a setup process, a computer user first moves a cursor to corner A' of the display area 205, and then presses a key at the location of corner A of the touch sensing area 112. In such a way, corner A of the touch sensing area 112 is set to correspond to corner A' of the display area 205. Corner B, C and D of the touch sensing area 112 can be set to correspond to corner B', C' and D' of the display area 205, respective, in the same manner. In other embodiments, touching a corner of the touch sensing area 112 in combination with pressing a dedicated key other than the key at the touched corner may also enact the correspondence between two corners. In other embodiments, a correspondence can be set between any spot on the touch sensing area 112 and any spot on the display area 205.

Figure 3:
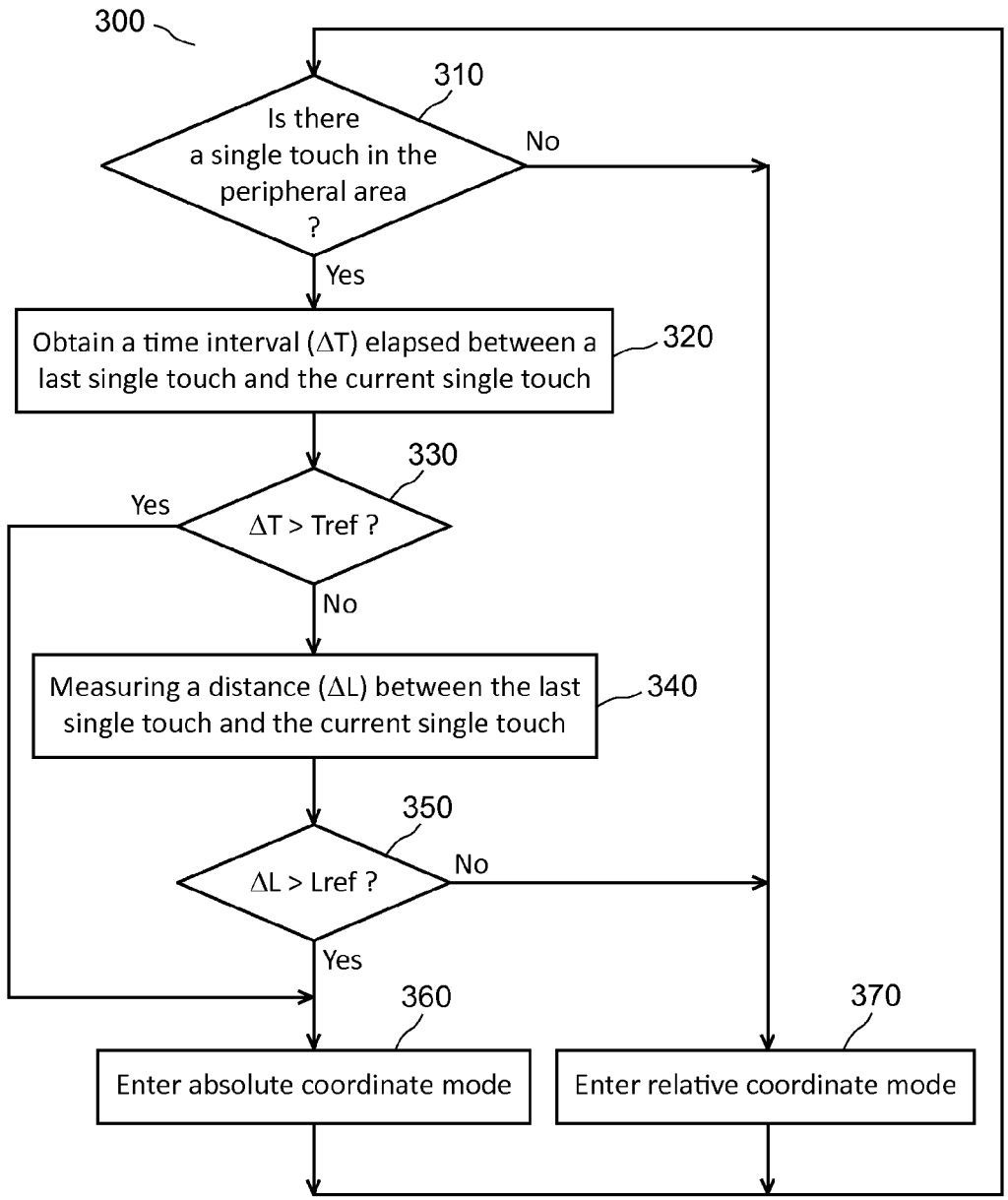
FIG. 3 is a flow chart diagram illustrating operational steps for switching the computer input device between absolute coordinate mode and relative coordinate mode according to an embodiment of the present invention.

FIG. 3 is a flow chart diagram illustrating a process 300 for switching the computer input device 100 between absolute coordinate mode and relative coordinate mode according to an embodiment of the present invention. First of all, the process 300 is active only during a pointing or mouse operation that is when a single touch on the touch sensing area 112 is detected. When two or more touches on the touch sensing area 112 are detected, or no touch is detected at all, the computer input device 100 enters keyboard operation.

Referring again to FIG. 3, the switching process 300 begins with detecting any single touch occurred on the peripheral area 115 in step 310. In case there is no touch on the peripheral area 115, the computer input device 100 enters relative coordinate mode in step 370, and then go back to step 310. In this case, there must be a single touch on the rest of the touch sensing area 112 for the computer input device 100 to be operating in a mouse operation. In case a single touch on the peripheral area 115 is detected in step 310, the process 300 obtains a time interval ($\Delta T$) elapsed between a last single touch and the current single touch in step 320. Here the last single touch can be anywhere within the touch sensing area 112. The elapsed time interval, $\Delta T$, is then compared with a predetermined reference time, Tref, in step 330. In embodiments, the predetermined reference time, Tref, is set at two seconds. During the elapsed time interval, $\Delta T$, two or more touches on the touch sensing area 112 may occur and is not considered as a last single touch. If $\Delta T$>Tref, the computer input device 100 enters absolute coordinate mode in step 360, and then go back to step 310. If $\Delta T \leq $Tref, the process 100 obtains a distance ($\Delta L$) between the last single touch and the current single touch in step 340. The distance, $\Delta L$, is then compared with a predetermined reference distance, Lref, in step 350. In embodiments, the predetermined reference distance is set at 60 millimeters. If $\Delta L$>Lref, the process 100 enters absolute coordinate mode in step 360, and then goes back to step 310. If $\Delta L \leq $Lref, the process 300 enters relative coordinate mode, and then goes back to step 310.

Figure 4:
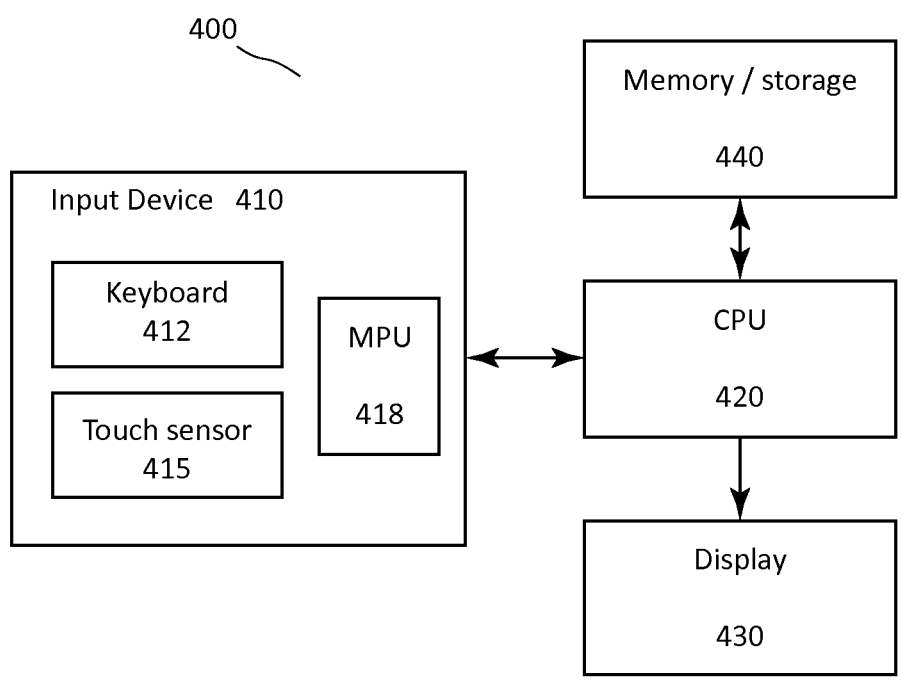
FIG. 4 is block diagram illustrating a computer system that includes a computer input device of the present invention.

FIG. 4 is block diagram illustrating a computer system 400 that includes a computer input device 410 of the present invention. The computing system 400 includes an input device 410, a central processing unit (CPU) 420, a display 430 and a memory and storage unit 440. The input device 410 comprises a conventional keyboard 412, a touch sensor 415 and a micro processing unit (MPU) 418. The touch sensor 415 overlays the conventional keyboard 412 and performs the touch sensing as depicted in FIGS. 1-3 and associated descriptions. The conventional keyboard 412 and the touch sensor 415 form a keyboard-mouse combo device. The MCU 418 interprets signals received from the keyboard 412 and the touch sensor as well as controlling the touch sensor 415. In one embodiment, the MPU 418 passes keyboard pressing data and touch coordinate data directly to the CPU 420 which then performs the switching process 300 of FIG. 3. In another embodiment, the MPU 418 performs the switching process 300 of FIG. 3, and passes either absolute coordinate data or relative coordinate data along with keyboard pressing data to the CPU 420.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A computer input method comprising:
   obtaining a time interval elapsed between a current single touch and a last single touch both on a designated object separated from a computer display upon detecting the current single touch;
   comparing the time interval with a predetermined reference time; and
   entering an absolute coordinate mode when the time interval is longer than the predetermined reference time, wherein the predetermined reference time is two seconds.

2. The computer input method of claim 1, wherein the designated object is a computer keyboard and touch-sensing combo device with a touch sensing area overlaying a plurality of keys of the keyboard.

3. The computer input method of claim 2, wherein the touch sensing area includes a designated area wherein only a single touch within the designated area is recognized as the current single touch.

4. The computer input method of claim 3 further comprising entering a relative coordinate mode when there is no single touch on the designated area being detected.

5. The computer input method of claim 3, wherein the designated area is at peripheral of the touch sensing area.

6. The computer input method of claim 1 further comprising corresponding a set of absolute coordinates of the touch sensing area with a set of absolute coordinates of a computer display.

7. The computer input method of claim 1 further comprising
   measuring a distance between the last single touch and the current single touch when the time interval is shorter than the predetermined reference time;
   comparing the measured distance with a predetermined reference distance; and
   entering a relative coordinate mode when the measured distance is smaller than the predetermined reference distance.

8. A computer input method comprising:
   obtaining a time interval elapsed between a current single touch on a designated area of a designated object separated from a computer display and a last single touch on the designated object upon detecting the current single touch;
   comparing the time interval with a predetermined reference time;
   measuring a distance between the last single touch and the current single touch when the time interval is shorter than the predetermined reference time;
   comparing the measured distance with a predetermined reference distance; and
   entering an absolute coordinate mode when the measured distance is longer than the predetermined reference distance.

9. The computer input method of claim 8, wherein the designated object is a computer keyboard and touch-sensing combo device with a touch sensing area overlaying a plurality of keys of the keyboard.

10. The computer input method of claim 8 further comprising entering a relative coordinate mode when there is no single touch on the designated area being detected.

11. The computer input method of claim 9, wherein the designated area is at peripheral of the touch sensing area.

12. The computer input method of claim 8 further comprising corresponding a set of absolute coordinates of the touch sensing area with a set of absolute coordinates of a computer display.

13. The computer input method of claim 8 further comprising entering an absolute coordinate mode when the time interval is longer than the reference time.

14. The computer input method of claim 8 further comprising entering a relative coordinate mode when the measured distance is shorter than the predetermined reference distance.

* * * * *